United States Patent
Chen et al.

(10) Patent No.: US 11,113,195 B2
(45) Date of Patent: Sep. 7, 2021

(54) METHOD, DEVICE AND COMPUTER PROGRAM PRODUCT FOR CACHE-BASED INDEX MAPPING AND DATA ACCESS

(71) Applicant: EMC IP Holding Company LLC, Hopkinton, MA (US)

(72) Inventors: You Chen, Shanghai (CN); Ao Sun, Shanghai (CN); Yunhai Gong, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/508,226

(22) Filed: Jul. 10, 2019

(65) Prior Publication Data
US 2020/0250095 A1  Aug. 6, 2020

(30) Foreign Application Priority Data
Jan. 31, 2019 (CN) .......................... 201910100397.4

(51) Int. Cl.
| | |
|---|---|
| *G06F 12/00* | (2006.01) |
| *G06F 12/0815* | (2016.01) |
| *G06F 16/2455* | (2019.01) |
| *G06F 16/22* | (2019.01) |
| *G06F 3/06* | (2006.01) |

(52) U.S. Cl.
CPC .......... *G06F 12/0815* (2013.01); *G06F 3/061* (2013.01); *G06F 3/0646* (2013.01); *G06F 3/0673* (2013.01); *G06F 16/2246* (2019.01); *G06F 16/24552* (2019.01)

(58) Field of Classification Search
CPC .......... G06F 12/0815; G06F 16/24552; G06F 16/2246; G06F 3/0646; G06F 3/061; G06F 3/0673
See application file for complete search history.

(56) References Cited

U.S. PATENT DOCUMENTS

| | | | | |
|---|---|---|---|---|
| 8,935,446 | B1 * | 1/2015 | Shilane | G06F 12/0871 710/62 |
| 9,390,116 | B1 * | 7/2016 | Li | G06F 16/2272 |
| 10,289,549 | B1 * | 5/2019 | Shilane | G06F 3/0685 |
| 2016/0195661 | A1 * | 7/2016 | Koyama | G02B 6/001 362/606 |
| 2016/0335302 | A1 * | 11/2016 | Teodorescu | H04L 51/046 |

* cited by examiner

*Primary Examiner* — Arvind Talukdar
(74) *Attorney, Agent, or Firm* — Amin, Turocy & Watson, LLP

(57) ABSTRACT

Embodiments for accessing data are provided. A method of accessing data comprises: receiving a request to access first data in a storage device, at least a part of data in the storage device being cached in a cache, and index information of the at least a part of data being recorded in an index structure associated with the cache; querying the index structure to determine whether the first data is cached in the cache; and accessing the first data based on a result of the query. Embodiments of the present disclosure can improve data accessing efficiency while saving memory consumption.

20 Claims, 7 Drawing Sheets

METHOD, DEVICE AND COMPUTER PROGRAM PRODUCT FOR CACHE-BASED INDEX MAPPING AND DATA ACCESS

RELATED APPLICATION

The present application claims the benefit of priority to Chinese Patent Application No. 201910100397.4, filed on Jan. 31, 2019, which application is hereby incorporated into the present application by reference herein in its entirety.

FIELD

Embodiments of the present disclosure generally relate to the field of data storage, and specifically to a method, a device and a computer program product for accessing data.

BACKGROUND

In modern storage systems, frequently-accessed data is usually cached in a cache to improve efficiency of data access. The cache is usually implemented using a storage medium with a higher access speed and therefore cost of the cache is relatively high. Since the cache usually has relatively high cost, its size is usually limited. As a result, it is desirable to provide a technology that is able to control the size of the cache effectively while improving its use efficiency.

SUMMARY

Embodiments of the present disclosure provide a method, a device and a computer program product for accessing data.

According to a first aspect of the present disclosure, there is provided a method of accessing data. The method comprises: receiving a request to access first data in a storage device, at least a part of data in the storage device being cached in a cache, and index information of the at least a part of data being recorded in an index structure associated with the cache; querying the index structure to determine whether the first data is cached in the cache; and accessing the first data based on a result of the query.

According to a second aspect of the present disclosure, there is provided a device for accessing data. The device comprises at least one processing unit and at least one memory. The at least one memory is coupled to the at least one processing unit and has instructions stored thereon and executed by the at least one processing unit. The instructions, when executed by the at least one processing unit, causes the device to perform acts comprising: receiving a request to access first data in a storage device, at least a part of data in the storage device being cached in a cache, and index information of the at least a part of data being recorded in an index structure associated with the cache; querying the index structure to determine whether the first data is cached in the cache; and accessing the first data based on a result of the query.

According to a third aspect of the present disclosure, there is provided a computer program product that is tangibly stored on a non-transitory computer storage medium and includes machine-executable instructions. The machine-executable instructions, when being executed by a device, cause the device to perform any step of the method described according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of example embodiments of the present disclosure will become more apparent from the following detailed description with reference to accompanying drawings, in which the same reference symbols refer to the same elements.

In various figures, the same or corresponding reference numbers refer to the same or corresponding parts.

DETAILED DESCRIPTION OF EMBODIMENTS

Figure 1:
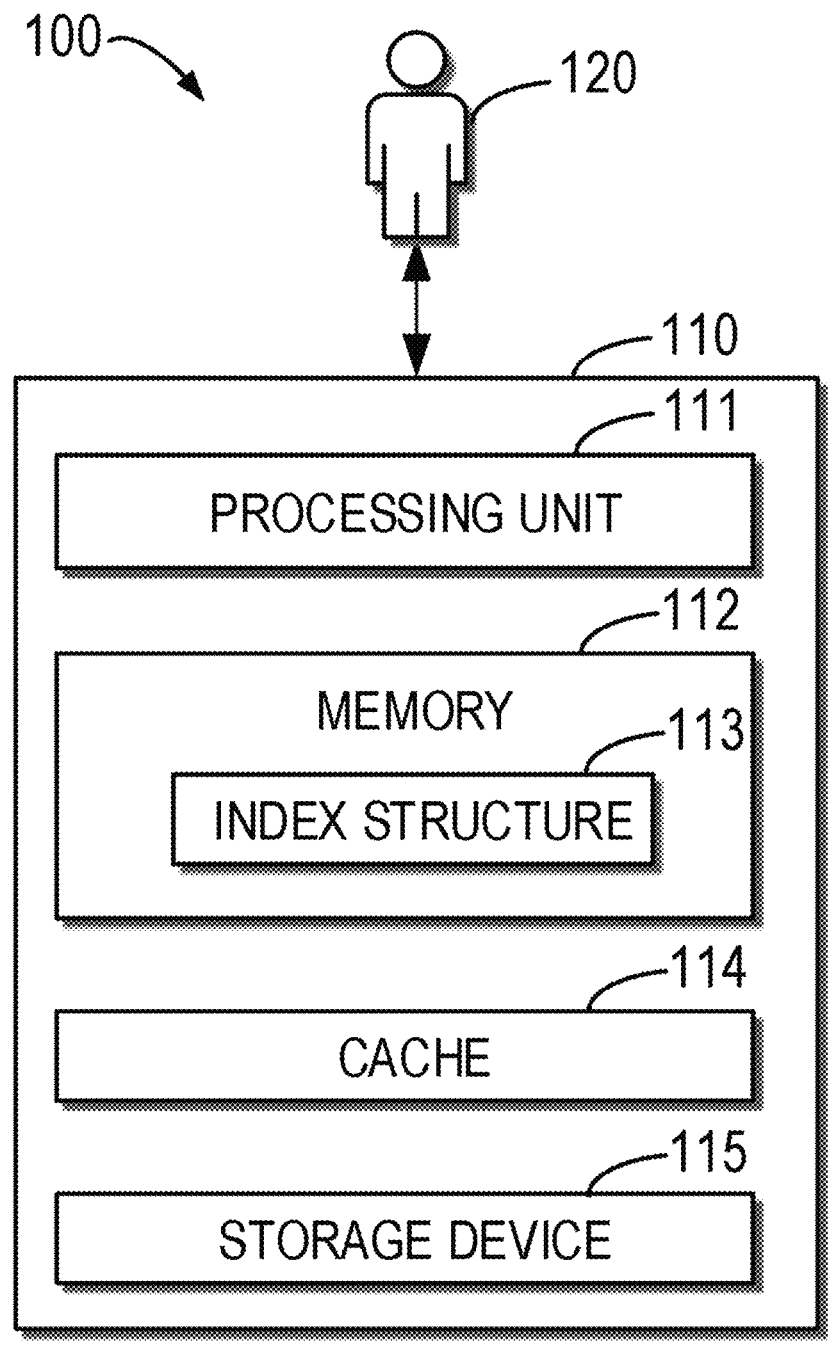
FIG. 1 illustrates a schematic diagram of an example environment in which embodiments of the present disclosure can be implemented.

Preferred embodiments of the present disclosure will be described as follows in greater detail with reference to the drawings. Although preferred embodiments of the present disclosure are illustrated in the drawings, it is to be understood that the present disclosure described herein may be implemented in various manners, but not limited to the embodiments illustrated herein. Rather, these embodiments are provided to make the present disclosure described herein clearer and more complete and convey the scope of the present disclosure described herein completely to persons skilled in the art.

As used herein, the term "includes" and its variants are to be read as open-ended terms that mean "includes, but is not limited to." The term "or" is to be read as "and/or" unless indicated otherwise. The term "based on" is to be read as "based at least in part on." The term "one example implementation" and "one implementation" are to be read as "at least one example implementation." The term "another implementation" is to be read as "at least one other implementation." Terms "a first", "a second" and the like may denote different or identical objects. The following text may also contain other explicit or implicit definitions.

As stated above, in modern storage systems, frequently-accessed data is usually cached in a cache to improve efficiency of data accessing. The cache is usually implemented using storage media with higher access speed and therefore it has higher cost.

In some conventional solutions, the cache may be implemented in a memory. The access speed of the cache implemented in the memory is very fast, but its cost is very high.

Therefore, the amount of data that may be cached by a memory-based cache is usually small, causing a lower overall hit rate of the cache. In other conventional solutions, the cache may be implemented in a storage device such as a solid state disk (SSD). A SSD-based cache exhibits a slower access speed as compared with a memory-based cache. However, since the cost per bit of the SSD is much lower than that of the memory, the SSD-based cache can cache more data, thereby improving overall hit rate of the cache.

In an SSD-based cache solution, a doubly linked list is usually used in the memory to record an order in which data in the cache is accessed, thereby enabling a control over the size of the cache. As such, when the amount of data in the cache exceeds a threshold or an available space is below a threshold, data being accessed the least recently may be evicted from the cache, for caching data that has been accessed more frequently. In order to avoid an overhead caused by linked list lookup, an additional hash table may usually be used to locate data in the linked list.

However, when an amount of data buffered in the SSD-based cache is large, the memory consumption caused by the doubly linked list and the extra hash table will be enormous. Therefore, it is desirable to provide a technology that may effectively control the size of the cache and improve its use efficiency while saving memory consumption.

Embodiments of the present disclosure propose a solution for accessing data. This solution implements an index structure for caching. Using this index structure may effectively control the size of the cache while improving its use efficiency. When the amount of data stored in the cache is large, the index structure according to an embodiment of the present disclosure may save a large amount of memory consumption as compared with the above-described conventional solution.

Embodiments of the present disclosure will be described in detail below with reference to the accompanying drawings. FIG. 1 illustrates a block diagram of an example environment 100 in which embodiments of the present disclosure may be implemented. It should be appreciated that the structure of the environment 100 is described for illustrative purposes only and is not intended to limit the scope of the disclosure. For example, embodiments of the present disclosure may also be applied to environments that are different from the environment 100.

As shown in FIG. 1, the environment 100 includes a host 110 which may include a processing unit 111, a memory 112, a cache 114 and a storage device 115. A user 120 may initiate a data access request to the host 110 to access data in the storage device 115. At least a part of the data in the storage device 115 may be cached in the cache 114, and index information of the at least a part of the cached data may be recorded in an index structure 113 in the memory 112.

The host 110 may be any physical computer, server, or the like. The storage device 115 may be any currently known or future-developed non-volatile storage medium such as a magnetic disk, an optical disk, a disk array, and the like. The cache 114 may be implemented with a storage medium having a higher access speed than the storage device 115, such as a solid state disk (SSD) or the like. Examples of the memory 112 include, for example, but are not limited to, a random access memory (RAM), a read only memory (ROM), an erasable programmable read only memory (EPROM or flash memory), a static random access memory (SRAM), and the like. Although the cache 114 and the memory 112 are shown separated from each other in FIG. 1, in some embodiments, the cache 114 may also be implemented in the memory 112 to achieve a higher access speed.

Upon receiving a data access request from the user 120, the processing unit 111 may query the index structure 113 in the memory 112, to determine whether data to be accessed by the user 120 is cached in the cache 114. If a result of the query indicates that the data to be accessed by the user 120 is present in the cache 114, then the data may be accessed from the cache 114. If the result of the query indicates that the data to be accessed by the user 120 is not cached in the cache 114, then the data may be accessed from the storage device 115. Additionally or alternatively, if the data is accessed from the storage device 115, the processing unit 111 may cache the data in the cache 114, for improving efficiency of subsequent access.

Figure 2:
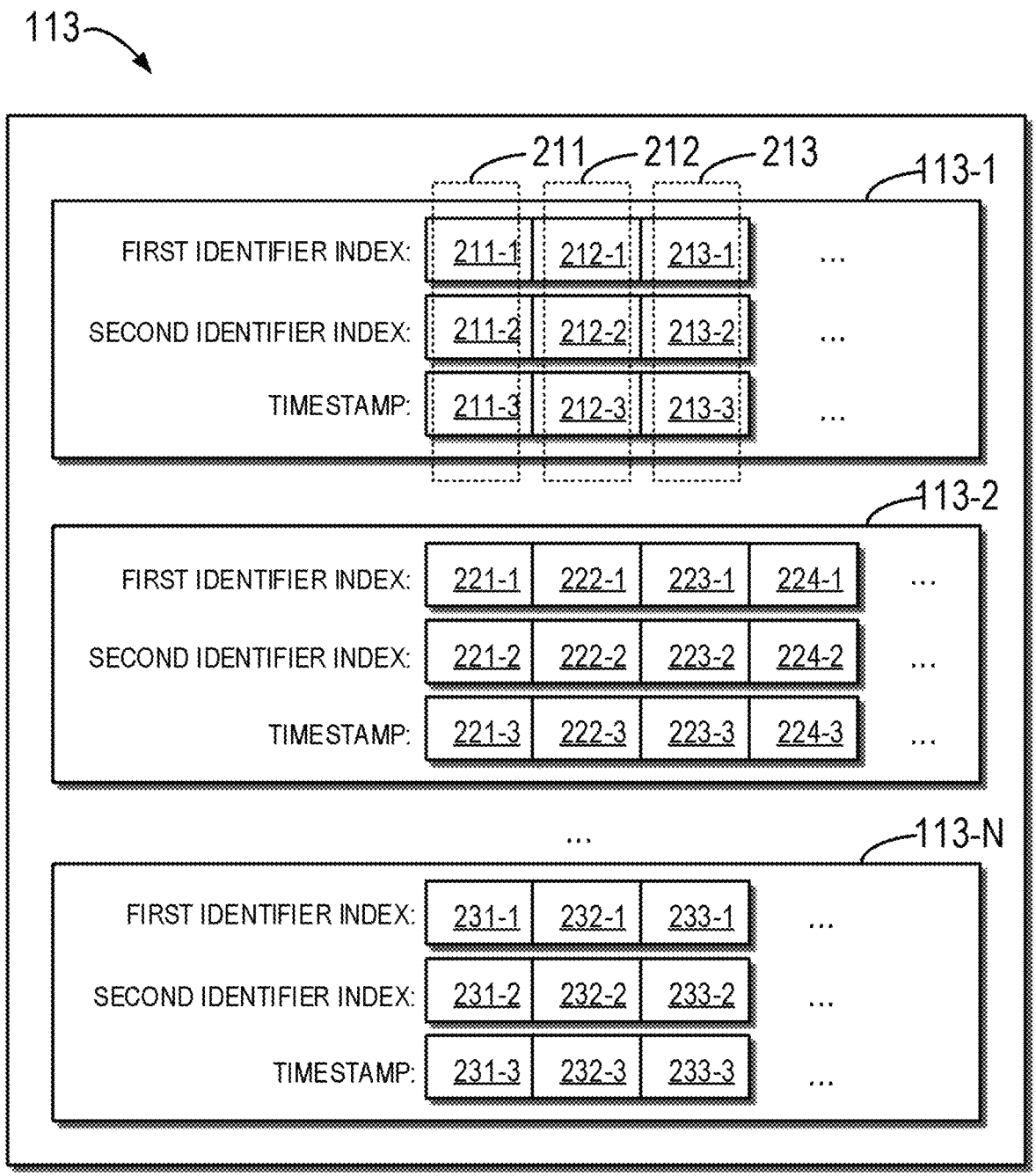
FIG. 2 illustrates a schematic diagram of an example index structure for caching according to embodiments of the present disclosure.

FIG. 2 illustrates a schematic diagram of an example index structure 113 according to an embodiment of the present disclosure. As shown in FIG. 2, the index structure 113 may include, for example, a plurality of index units 113-1, 113-2 . . . 113-N (where N is a natural number) for storing index information of data cached in the cache 114. Taking the index unit 113-1 as an example, the index information of the data may be stored, for example, in a plurality of slots 211, 212, 213 . . . . Taking the slot 211 as an example, it may store the index information 211-1 and 211-2 of the data and time information 211-3 when the data is accessed, and these information may be collectively referred to as "cache entry 211".

In some embodiments, the data in the storage device 115 may be organized in a plurality of tree structures (e.g., B+ trees). Taking the data to be accessed by the user 120 (also referred to as "first data" herein) as an example, the first data may be stored (e.g., in a form of key-value pair) in one of the plurality of tree structures, and its index information (also referred to herein as "first index information") for example may include a first identifier for identifying the tree structure and a second identifier for identifying the first data in the tree structure (for example, a key in the key-value pair).

In some embodiments, when the first data is cached into the cache 114, the first index information may be recorded in the index structure 113 correspondingly. For example, one of the plurality of index units (e.g., the index unit 113-1) may be selected to record the first index information. The selection of the index unit may be implemented based on a predetermined hash function, such that the index information of the data is evenly distributed among the plurality of index units. For example, the first index information is recorded as an index entry 211 in the index unit 113-1, where the index value for the first identifier may be recorded at a position 211-1, and the index value for the second identifier may be recorded at a position 211-2. Furthermore, the time at which the first data is last accessed may be recorded at a position 211-3 in the index entry 211. When the first data is accessed again, the last access time recorded at the position 211-3 may be updated.

In some embodiments, the index 211-1 of the first identifier and the index 211-2 of the second identifier may be generated based on a predetermined hash function, and they can be used for positioning the first data cached in the cache 114. In some embodiments, a 128-bit index value may be generated for each of the first identifier and the second identifier based on, for example, a murmur3 hash function. In some embodiments, under a condition that a hash collision probability will not be increased significantly, the index 211-1 of the first identifier may only retain a part (e.g., 32 bits) of the 128-bit index value for the first identifier, and the index 211-2 of the second identifier may only retain a part (e.g., 64 bits) of the 128-bit index value for the first identifier so as to further save storage space occupied by the index structure 113. It should be appreciated that the above merely lists example implementations of generating the index of the first identifier and the index of the second identifier, and is not intended to limit the scope of the present disclosure. In other embodiments, other hash functions or other manners than hash functions are also applicable.

In some embodiments, the number of index units in the index structure 113 may be a predetermined number. The number of slots in each index unit may be expanded as the amount of index information stored in the index unit increases. In some embodiments, in order to control the size of the cache 114, the total number of cache entries stored in the index structure 113 should not exceed a first threshold and the number of cache entries stored in each index unit should not exceed a second threshold.

In some embodiments, when the total number of cache entries stored in the index structure 113 exceeds the first threshold, or when the number of cache entries stored in a certain index unit exceeds the second threshold, a cache entry in the index structure 113 may be evicted, and data associated with the evicted cache entry will be removed from the cache 114. The eviction of the cache entry may be performed on one of the plurality of index units. For example, a cache entry whose last access time is earlier than respective last access times of other cache entries may be determined by comparing respective timestamps of all of the cache entries in the index unit. Since the number of cache entries in each index unit is limited, the time spent on determining the cache entry to be evicted is usually short.

Figure 3:
FIG. 3 illustrates a flow chart of an example method of accessing data according to embodiments of the present disclosure.

Implementations of example methods in accordance with embodiments of the present disclosure are described in detail below with reference to the figures. FIG. 3 illustrates a flow chart of an example method 300 of accessing data according to an embodiment of the present disclosure. For example, the method 300 may be performed by the host 110 as shown in FIG. 1. It should be understood that the method 300 may also include additional actions not shown and/or may omit the illustrated actions, and the scope of the present disclosure is not limited in this respect. The method 300 will be described in detail below with reference to FIG. 1 and FIG. 2.

At block 310, the host 110 receives a request to access first data in the storage device 115. In some embodiments, at least a part of data in the storage device 115 is cached in the cache 114, and index information of the at least part of data is recorded in index structure 113 as shown in FIG. 1 and/or FIG. 2. This request may, for example, indicate first index information of the first data. In some embodiments, the first data may be stored, for example, in a key-value pair in one of a plurality of tree structures. The first index information for example may include a first identifier for identifying a tree structure in which the first data is stored and a second identifier for identifying the first data in the tree structure (e.g., a key in the key-value pair).

Figure 4:
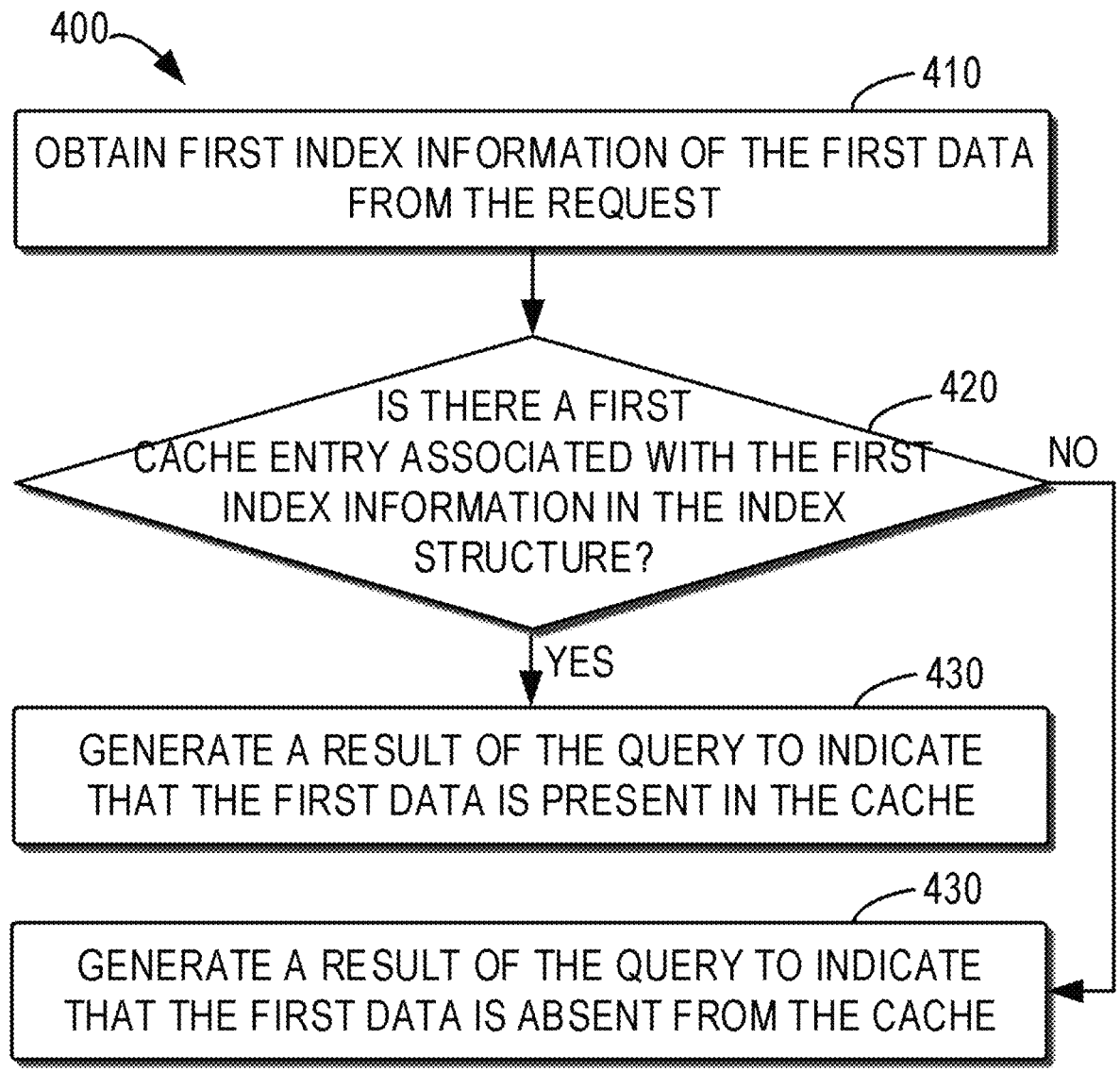
FIG. 4 illustrates a flow chart of an example method of querying an index structure according to embodiments of the present disclosure.

At block 320, the host 110 queries the index structure 113 to determine whether the first data is cached in the cache 114. For example, FIG. 4 illustrates a flow chart of an example method 400 of querying an index structure according to an embodiment of the present disclosure. The method 400 may be implemented as an example of the block 320 as shown in FIG. 3. It should be appreciated that the method 400 may also include additional actions not shown and/or may omit the illustrated actions, and the scope of the present disclosure is not limited in this respect.

At block 410, the host 110 obtains first index information of the first data from the request. At block 420, the host 110 determines whether a cache entry (also referred to herein as a "first cache entry") associated with the first index information is present in the index structure 113. In some embodiments, the host 110 for example may determine an index value (also referred to herein as "a first index value") of the first identifier in the first index information and an index value (also referred to as "a second index value" herein) of the second identifier in the first index information. Then the host 110 may look up for all cache entries in the index structure 113 to determine if a cache entry that records the first index value and the second index value is present. If such a cache entry is present, then at block 430, the host 110 may generate a query result to indicate that the first data is present in the cache 114. If such a cache entry is absent, then at block 440, the host 110 may generate a query result to indicate that the first data is absent from the cache 114.

Figure 5:
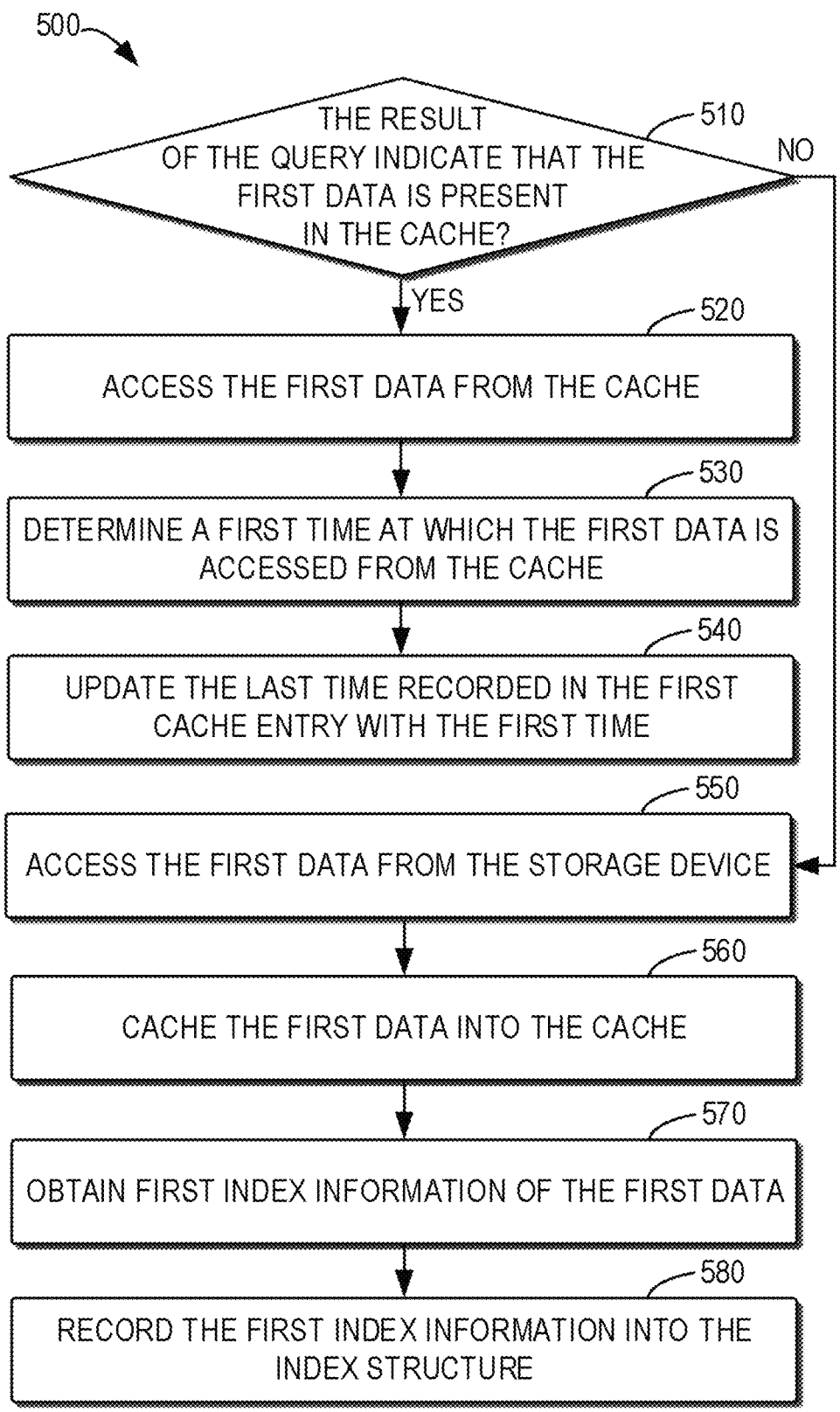
FIG. 5 illustrates a flow chart of an example method of accessing data based on query results for an index structure according to embodiments of the present disclosure.

Returning to FIG. 3, at block 330, the host 110 accesses the first data based on the query result. For example, FIG. 5 illustrates a flow chart of an example method 500 for accessing data based on the query result according to an embodiment of the present disclosure. The method 500 may be implemented as an example of block 330 as shown in FIG. 3. It should be appreciated that the method 500 may also include additional actions not shown and/or may omit the illustrated actions, and the scope of the present disclosure is not limited in this respect.

At block 510, the host 110 determines if the query result indicates that the first data has been cached in the cache 114. If yes, at block 520, the host 110 obtains the first data from the cache 114, for returning the first data to the user 120. Then, at block 530, the host 110 may determine a time (also referred to as a "first time" herein) when the first data is accessed from the cache 114. At block 540, the host 110 may update the last access time recorded in the first cache entry with the determined first time.

If the host 110 determines that the query result indicates that the first data is absent from the cache 114, then at block 550, the host 110 may obtain the first data from storage device 115 to return the first data to the user 120. Additionally, at block 560, the host 110 may cache the first data into the cache 114. At block 570, the host 110 may obtain first index information of the first data. For example, the host 110 may obtain the first index information from the request for accessing the first data. Then, the host 110 may record the first index information in the index structure 113.

Figure 6:
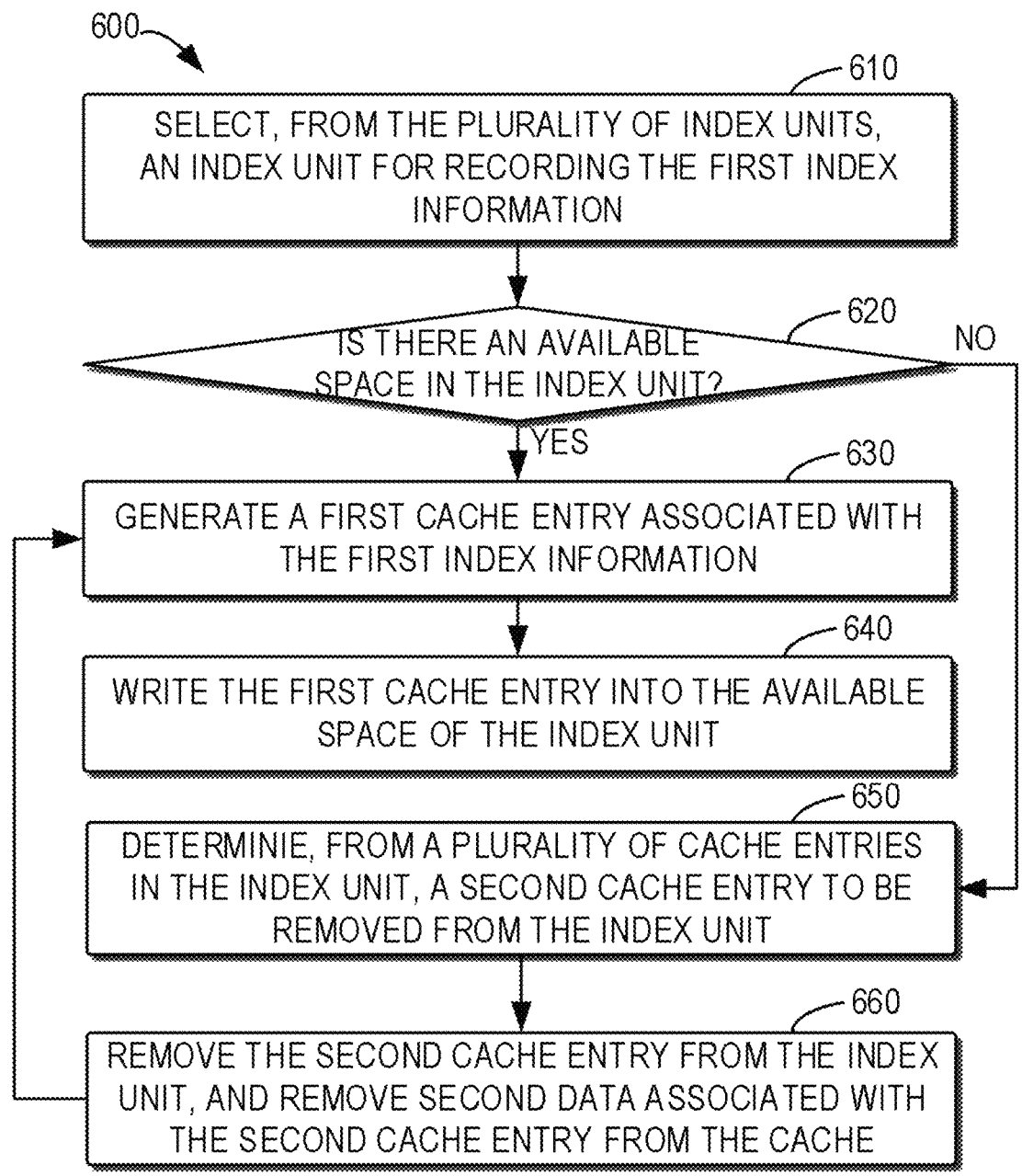
FIG. 6 illustrates a flow chart of an example method of recording index information in an index structure according to embodiments of the present disclosure.

FIG. 6 illustrates a flow chart of an example method 600 of recording index information in an index structure according to an embodiment of the present disclosure. For example, the method 600 may be implemented as an example of the block 580 as shown in FIG. 5. It should be appreciated that the method 600 may also include additional actions not shown and/or may omit the illustrated actions, and the scope of the present disclosure is not limited in this respect.

At block 610, the host 110 may select, from the plurality of index units 113, an index unit for recording the first index information. In some embodiments, the host 110 may select an index unit for recording the first index information based on a predetermined hash function such that the index information of the data is uniformly recorded in the plurality of index units 113. It is assumed below that the selected index unit is the index unit 113-1 as shown in FIG. 2.

At block 620, the host 110 may determine whether there is an available space in the selected index unit 113-1. In some embodiments, the host 110 may determine whether the total number (also referred to as "a first number" herein) of cache entries stored in index structure 113 is below a first threshold and determine whether the number (also referred to as "a second number" herein) of cache entries in the selected index unit 113-1 is below a second threshold. If the first number is below the first threshold and the second number is below the second threshold, then the host 110 may determine that there is an available space in the selected index unit 113-1. If the first data exceeds the first threshold or the second number exceeds the second threshold, the host 110 may determine that there is no available space in the selected index unit 113-1.

If the host 110 determines that there is an available space in the selected index unit 113-1, then at block 630 the host 110 may generate a first cache entry associated with the first index information. In some embodiments, the first data is stored in a tree structure in the storage device 115, and the first index information includes a first identifier for identifying the tree structure in the storage device 115 and a second identifier for identifying the first data in the tree structure. The host 110 may generate a first index value for the first identifier and a second index value for the second identifier based on a predetermined hash function. Moreover, the host 110 may determine a time at which the first data is accessed from the storage device 115 (also referred to as "a second time" herein). The host 110 may include the first index value, the second index value and the second time in the first cache entry. At block 640, the host 110 may store the first cache entry in the available space in the selected index unit 113-1.

If the host 110 determines that there is no available space in the selected index unit 113-1, then at block 650 the host 110 determines, from the plurality of cache entries stored by the index unit 113-1, a cache entry (also referred to as "a second cache entry" herein) to be removed from the index unit 113-1. In some embodiments, the host 110 may determine a cache entry whose last access time is earlier than corresponding last access time of other cache entries by comparing respective timestamps of all cache entries in the index unit 113-1.

At block 660, the host 110 may remove the determined second cache entry from the index unit 113-1 and remove the data (also referred to as "second data" herein) corresponding to the second cache entry from the cache 114, thereby obtaining an available space for storing a new cache entry. The method 600 proceeds to block 630, where the host 110 generates a first cache entry associated with the first index information. Then, at block 640, the host 110 stores the generated first cache entry into the available space in the selected index unit 113-1.

The solution according to embodiments of the present disclosure implements an index structure for a cache. This index structure can be used to improve use efficiency of the cache while effectively controlling the size of the cache. When the amount of data stored in the cache is relatively large, the index structure according to embodiments of the present disclosure can save a large amount of memory consumption compared to conventional solutions.

Taking the conventional solutions based on the doubly linked list and the extra hash table described above as an example, the storage space consumed by management of the cache may be expressed as the following formula (1):

$$N \cdot sizeof \text{ (linked list nodes)} + \frac{N}{\text{load factor}} \cdot sizeof \text{ (hash table node)} \quad (1)$$

where N represents the number of nodes in the doubly linked list, namely, the number of data entries stored in the cache. The load factor is usually less than one (e.g., 0.75), which represents a ratio between the amount of valid data in the hash table and an actual size of the hash table.

In contrast, a storage space consumed by the index structure according to an embodiment of the present disclosure may be expressed as the following formula (2):

$$\frac{M \cdot S}{\text{load factor}} \cdot sizeof \quad (2)$$
(first identifier index + second identifier index + *timestamp*)

where M represents the number of index units in the index structure, S represents the average number of slots in each index unit, and a product of M and S may represent the number of data entries stored in the cache (i.e., "N" in the above formula (1)). The load factor in the formula (2) is usually greater than the load factor in formula (1), for example, 0.9. Furthermore, since the size of each cache entry in the formula (2) (i.e., a sum of the size of the first identifier index, the second identifier index and the timestamp) is usually much smaller than that of each hash table node in the formula (1), the storage overhead obtained according to the formula (2) will be much smaller than the storage overhead obtained according to the formula (1). For example, in the case where the total number of cache entries in the index structure (namely, the number of data entries stored in the cache) is 10 million, the cache index structure according to the embodiment of the present disclosure may save about 70% of storage overhead as compared with the conventional solutions according to formula (1).

Example implementations of methods in accordance with the present disclosure have been described above in detail with reference to FIG. 1 through FIG. 6, and an implementation of a corresponding device will be described hereinafter.

In some embodiments, a device for accessing data is provided. The device comprises: a receiving module configured to receive a request to access first data in a storage device, at least a part of data in the storage device being cached in a cache, and index information of the at least a part of data being recorded in an index structure associated with the cache; a query module configured to query the index structure to determine whether the first data is cached in the cache; and an access module configured to access the first data based on a result of the query.

In some embodiments, the cache is implemented in a further storage device that is different from the storage device, an access speed of the further storage device exceeds the access speed of the storage device, and the index structure is implemented in a memory.

In some embodiments, the query module comprises: a first obtaining unit configured to obtain first index information of the first data from the request; a determining unit configured to determine whether a first cache entry associated with the first index information is present in the index structure; and a generating unit configured to in response to determining that the first cache entry is present in the index structure, generate the result of the query to indicate that the first data is present in the cache, and in response to determining that the first cache entry is absent from the index structure, generate the result of the query to indicate that the first data is absent from the cache.

In some embodiments, the first data is stored in a tree structure in the storage device, the first index information comprises a first identifier for identifying the tree structure in the storage device and a second identifier for identifying the first data in the tree structure, and the first cache entry at least comprises a first index value for the first identifier and a second index value for the second identifier.

In some embodiments, the access module comprises: a first access unit configured to in response to the result of the query indicating that the first data is present in the cache, access the first data from the cache; and an update unit configured to in response to the first data being accessed from the cache, update the first cache entry in the index structure.

In some embodiments, the first cache entry records a last time at which the first data was accessed, and the update unit is configured to: in response to the first data being accessed from the cache, determine a first time at which the first data is accessed from the cache; and update the last time recorded in the first cache entry with the first time.

In some embodiments, the access module comprises: a second access unit configured to in response to the result of the query indicating that the first data is absent from the cache, access the first data from the storage device; a cache unit configured to cache the first data into the cache; a second obtaining unit configured to obtain first index information of the first data; and a recording unit configured to record the first index information into the index structure.

In some embodiments, the index structure is divided into a plurality of index units, one of the plurality of index units comprises respective spaces for storing a set of cache entries, and a cache entry from the set of cache entries is used to record index information of data corresponding to the cache entry. The recording unit is configured to: select, from the plurality of index units, an index unit for recording the first index information; determine whether there is an available space in the index unit; and in response to determining that there is an available space in the index unit, generate a first cache entry associated with the first index information; and write the first cache entry into the available space.

In some embodiments, the recording unit is further configured to: select, from the plurality of index units, an index unit for recording the first index information, such that index information of data is uniformly recorded in the plurality of index units.

In some embodiments, the recording unit is further configured to: determine whether a first number of cache entries stored in the index structure is below a first threshold; determine whether a second number of cache entries stored in the index unit is below a second threshold; in response to the first number being below the first threshold and the second number being below the second threshold, determine that there is an available space in the index unit; and in response to the first number exceeding the first threshold or the second number exceeding the second threshold, determine there is no available space in the index unit.

In some embodiments, the first data is stored in a tree structure in the storage device, the first index information comprises a first identifier for identifying the tree structure in the storage device and a second identifier for identifying the first data in the tree structure. The recording unit is further configured to: generate a first index value for the first identifier; generate a second index value for the second identifier; in response to the first data being accessed from the storage device, determine a second time at which the first data is accessed from the storage device; and generate the first cache entry based on the first index value, the second index value and the second time.

In some embodiments, the index unit comprises a plurality of cache entries. The recording unit is further configured to: in response to determining that there is no available space in the index unit, determine, from the plurality of cache entries, a second cache entry to be removed from the index unit, the second cache entry being stored in a space in the index unit; remove the second cache entry from the index unit, so as to cause second data corresponding to the second cache entry to be removed from the cache; generate a first cache entry associated with the first index information; and write the first cache entry into the space.

In some embodiments, a cache entry from the plurality of cache entries records a last time at which data corresponding to the cache entry was accessed. The recording unit is further configured to: select the second cache entry from the plurality of cache entries such that the last time recorded in the second cache entry is earlier than the last time recorded in a further cache entry from the plurality of cache entries.

Figure 7:
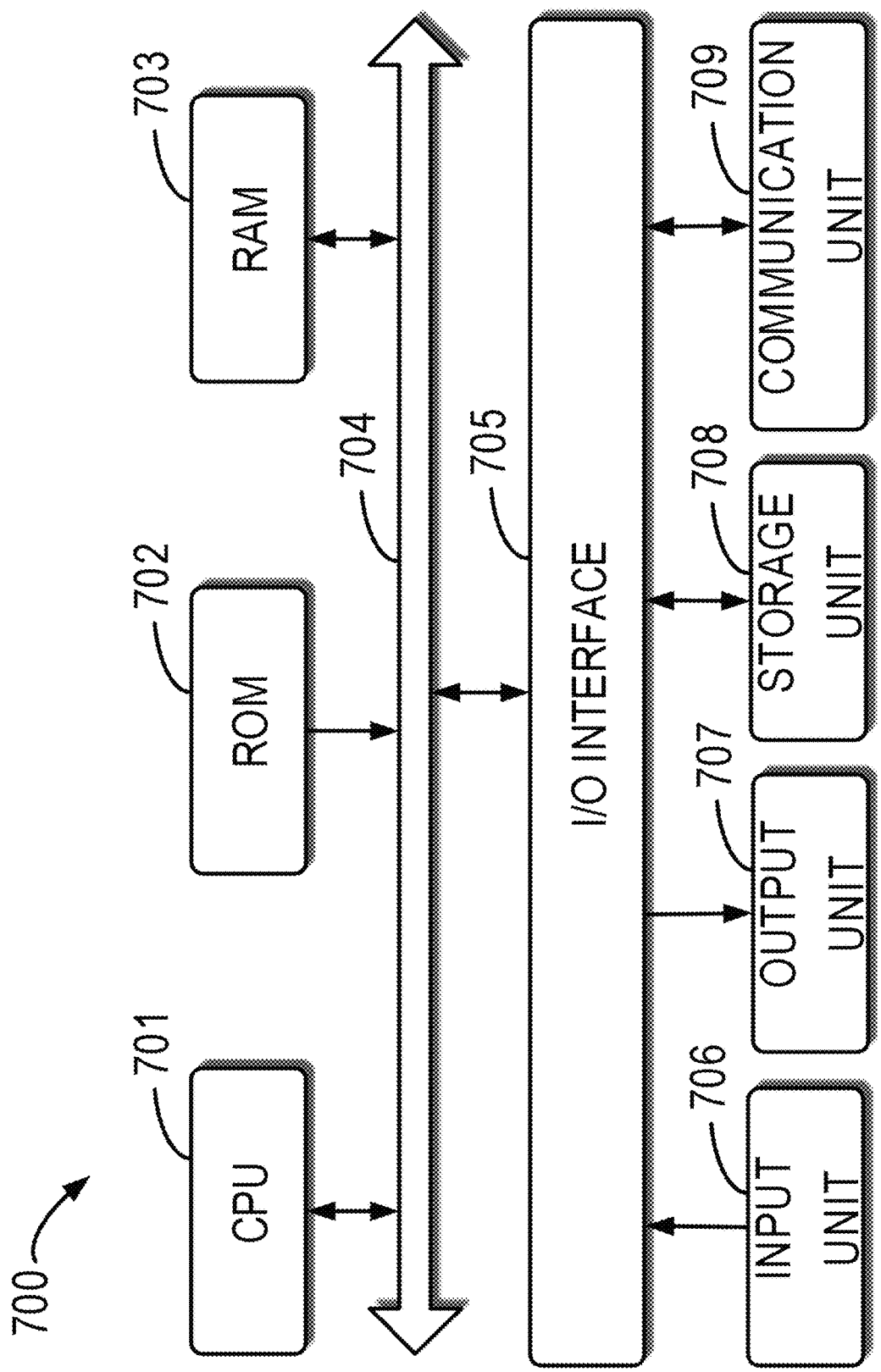
FIG. 7 illustrates a schematic block diagram of an example device that can be used to implement embodiments of the present disclosure.

FIG. 7 illustrates a block diagram of an example device 700 can be used to implement an embodiment of the present disclosure. For example, a storage manager 320 as shown in FIG. 3 may be implemented by the device 700. As shown in FIG. 7, the device 700 comprises a central processing unit (CPU) 701 that may perform various appropriate actions and processing based on computer program instructions stored in a read-only memory (ROM) 702 or computer program instructions loaded from a storage unit 708 to a random access memory (RAM) 703. In the RAM 703, there further store various programs and data needed for operations of the device 700. The CPU 701, ROM 702 and RAM 703 are connected to each other via a bus 704. An input/output (I/O) interface 705 is also connected to the bus 704.

Various components in the device 700 are connected to the I/O interface 705, including: an input unit 706 such as a keyboard, a mouse and the like; an output unit 707 including various kinds of displays and a loudspeaker, etc.; a storage unit 708 including a magnetic disk, an optical disk, and etc.; a communication unit 709 including a network card, a modem, and a wireless communication transceiver, etc. The communication unit 709 allows the device 700 to exchange information/data with other devices through a computer network such as the Internet and/or various kinds of telecommunications networks.

Various processes and processing described above, e.g., the method 300, 400, 500 and/or 600 may be performed by the processing unit 701. For example, in some embodiments, the method 300, 400, 500 and/or 600 may be implemented as a computer software program that is tangibly included in a machine-readable medium, e.g., the storage unit 708. In some embodiments, part or all of the computer program may be loaded and/or mounted onto the device 700 via the ROM 702 and/or the communication unit 709. When the computer program is loaded into the RAM 703 and executed by the CPU 701, one or more acts of the method 300, 400, 500 and/or 600 as described above may be performed.

The present disclosure may be a method, a device, a system and/or a computer program product. The computer program product may include a computer-readable storage medium on which computer-readable program instructions for executing various aspects of the present disclosure are embodied.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not construed as transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein may be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer readable program instructions for storage in a computer-readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may be executed entirely on a user's computer, partly on a user's computer, as a stand-alone software package, partly on a user's computer and partly on a remote computer or entirely on a remote computer or a server. In the latter scenario, the remote computer may be connected to the user's computer through any type of network, including a local area network (LAN) or a wide area network (WAN), or the connection may be made to an external computer (for example, through the Internet using an Internet service provider). In some embodiments, an electronic circuitry including, for example, a programmable logic circuitry, field-programmable gate arrays (FPGA), or programmable logic arrays (PLA) may execute the computer readable program instructions by utilizing state information of the computer-readable program instructions to personalize the electronic circuitry, in order to perform aspects of the present disclosure.

Aspects of the present disclosure are described herein with reference to flowchart and/or block diagrams of methods, device (systems), and computer program products according to embodiments of the disclosure. It will be understood that each block of the flowchart and/or block diagrams, and combinations of blocks in the flowchart and/or block diagrams, may all be implemented by computer-readable program instructions.

These computer readable program instructions may be provided to a processing unit of a general purpose computer, a special purpose computer, or other programmable data processing apparatus to produce a machine, such that the instructions, when executed by the processor of the computer or other programmable data processing apparatus, resulting in means for implementing the functions/acts specified in the flowchart and/or one or more blocks in the block diagram. These computer-readable program instructions may also be stored in a computer-readable storage medium that may make a computer, a programmable data processing apparatus, and/or other devices to function in a particular manner, such that the computer-readable storage medium having instructions stored therein comprises an article of manufacture including instructions which implement aspects of the function/act specified in the flowchart and/or one or more blocks in the block diagram.

The computer-readable program instructions may also be loaded onto a computer, other programmable data processing apparatus, or other device to cause a series of operational steps to be performed on the computer, other programmable apparatus or other device to produce a computer implemented process, such that the instructions which executed on the computer, other programmable apparatus, or other device implement the functions/acts specified in the flowchart and/or one or more blocks in the block diagram.

The flowchart and block diagrams in the Figures illustrate an architecture, a functionality, and an operation of possible implementations of systems, methods and computer program products according to various embodiments of the present disclosure. In this regard, each block in the flowchart or block diagrams may represent a module, a segment, or a portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in a reverse order, depending upon the functionality involved. It will also be noted that each block of the block diagrams and/or flowchart, and combinations of blocks in the block diagrams and/or flowchart, may be implemented by special purpose hardware-based systems that perform specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. Terminologies used herein was chosen to best explain the principles of the embodiments, the practical application or technical improvement over technologies found in the marketplace, or to enable others of ordinary skill in the art to understand the embodiments disclosed herein.

We claim:

1. A method of accessing data, comprising:
    receiving, by a system comprising a processor, a request to access first data in a storage device, at least a part of data in the storage device being cached in a cache, and index information of at least the part of data being recorded in an index structure associated with the cache, wherein the index structure is not included in the cache and comprises:
- a first identifier data structure that is indicative of a key of a key-value pair architecture, wherein the first identifier data structure identifies a tree structure;
- a second identifier data structure that is indicative of a value of the key-value pair architecture, wherein the second identifier data structure identifies the first data within the tree structure; and
- a timestamp data structure that stores timestamp data indicative of a time at which associated data in the cache was last accessed;

querying the index structure to determine whether the first data is cached in the cache; and
accessing the first data based on a result of the query.

2. The method according to claim 1, wherein the cache is implemented in a further storage device that is different from the storage device, and a cache access speed of the further storage device exceeds the access speed of the storage device,
wherein the index structure is implemented in a memory that has a memory access speed that exceeds the cache access speed, and
wherein the data in the storage device is stored according to the key-value pair architecture.

3. The method according to claim 1, wherein the querying the index structure comprises:
obtaining first index information of the first data from the request, wherein the first index information comprises the first identifier data structure and the second identifier data structure;
determining whether a first cache entry associated with the first index information is present in the index structure;
in response to determining that the first cache entry is present in the index structure, generating the result of the query to indicate that the first data is present in the cache; and
in response to determining that the first cache entry is absent from the index structure, generating the result of the query to indicate that the first data is absent from the cache.

4. The method according to claim 3, wherein the first data is stored in the tree structure in the storage device, the first identifier data structure identifies the tree structure in the storage device and the second identifier data structure identifies the first data in the tree structure.

5. The method according to claim 3, wherein the accessing the first data based on the result of the query comprises:
in response to the result of the query indicating that the first data is present in the cache, performing the accessing the first data from the cache; and
in response to the first data being accessed from the cache, updating the first cache entry in the index structure.

6. The method according to claim 5, wherein the first cache entry records a last time at which the first data was accessed, and wherein the updating the first cache entry comprises:
in response to the first data being accessed from the cache, determining a first time at which the first data is accessed from the cache; and
updating the last time recorded in the first cache entry with the first time.

7. The method according to claim 1, wherein the accessing the first data based on the result of the query comprises:

in response to the result of the query indicating that the first data is absent from the cache, accessing the first data from the storage device;
caching the first data into the cache;
obtaining first index information of the first data; and
recording the first index information into the index structure.

8. The method according to claim 7, wherein the index structure is divided into a plurality of index units, one of the plurality of index units comprises respective spaces for storing a set of cache entries, and a cache entry from the set of cache entries is used to record index information of data corresponding to the cache entry, and wherein the recording the first index information into the index structure comprises:
selecting, from the plurality of index units, an index unit for recording the first index information;
determining whether there is an available space in the index unit;
in response to determining that there is an available space in the index unit, generating a first cache entry associated with the first index information; and
writing the first cache entry into the available space.

9. The method according to claim 8, wherein the selecting the index unit for recording the first index information comprises:
selecting, from the plurality of index units, the index unit for recording the first index information, such that index information of data is uniformly recorded in the plurality of index units.

10. The method according to claim 8, wherein the determining whether there is an available space in the index unit comprises:
determining whether a first number of cache entries stored in the index structure is below a first threshold;
determining whether a second number of cache entries stored in the index unit is below a second threshold;
in response to the first number being below the first threshold and the second number being below the second threshold, determining that there is an available space in the index unit; and
in response to the first number exceeding the first threshold or the second number exceeding the second threshold, determining that there is no available space in the index unit.

11. The method according to claim 8, wherein the first data is stored in the tree structure in the storage device, the first index information comprises a first identifier for identifying the tree structure in the storage device and a second identifier for identifying the first data in the tree structure, and wherein the generating the first cache entry comprises:
generating a first index value for the first identifier;
generating a second index value for the second identifier;
in response to the first data being accessed from the storage device, determining a second time at which the first data is accessed from the storage device; and
generating the first cache entry based on the first index value, the second index value and the second time.

12. The method according to claim 8, wherein the index unit comprises a plurality of cache entries, and the method further comprises:
in response to determining that there is no available space in the index unit, determining, from the plurality of cache entries, a second cache entry to be removed from the index unit, the second cache entry being stored in a space in the index unit;

removing the second cache entry from the index unit, so as to cause second data corresponding to the second cache entry to be removed from the cache;

generating a first cache entry associated with the first index information; and writing the first cache entry into the space.

13. The method according to claim 12, wherein a cache entry from the plurality of cache entries records a last time at which data corresponding to the cache entry was accessed, and wherein the determining the second cache entry to be removed from the index unit comprises:

selecting the second cache entry from the plurality of cache entries, such that the last time recorded in the second cache entry is earlier than the last time recorded in a further cache entry from the plurality of cache entries.

14. A device for accessing data, comprising:

at least one processing unit;

at least one memory comprising a memory that stores an index structure, wherein the at least one memory is coupled to the at least one processing unit and having instructions stored thereon, the instructions, when executed by the at least one processing unit, causing the device to perform acts comprising:

receiving a request to access first data in a storage device, at least a part of data in the storage device being cached in a cache, and index information of at least the part of data being recorded in the index structure that is separate from and references the cache, the index information comprising:

a first identifier data structure that is indicative of a key of a key-value pair format, wherein the first identifier data structure identifies a tree structure;

a second identifier data structure that is indicative of a value of the key-value pair format, wherein the second identifier data structure identifies the first data within the tree structure; and timestamp data that is indicative of a time at which associated data in the cache was last accessed;

querying the index structure to determine whether the first data is cached in the cache; and accessing the first data based on a result of the query.

15. The device according to claim 14, wherein the querying the index structure comprises:

obtaining first index information of the first data from the request, wherein the first index information comprises the first identifier data structure and the second identifier data structure;

determining whether a first cache entry associated with the first index information is present in the index structure;

in response to determining that the first cache entry is present in the index structure, generating the result of the query to indicate that the first data is present in the cache; and in response to determining that the first cache entry is absent from the index structure, generating the result of the query to indicate that the first data is absent from the cache, wherein at least one of:

the first data is stored in the tree structure in the storage device, the first index information comprises a first identifier, stored in the first identifier data structure, for identifying the tree structure in the storage device and a second identifier, stored in the second identifier data structure, for identifying the first data in the tree structure, or the accessing the first data based on the result of the query comprises, in response to the result of the query indicating that the first data is present in the cache, performing the accessing the first data from the cache, and, in response to the first data being accessed from the cache, updating the first cache entry in the index structure, wherein the first cache entry records a last time at which the first data was accessed, and wherein the updating the first cache entry comprises in response to the first data being accessed from the cache, determining a first time at which the first data is accessed from the cache; and updating the last time recorded in the first cache entry with the first time.

16. The device according to claim 14, wherein the accessing the first data based on the result of the query comprises:

in response to the result of the query indicating that the first data is absent from the cache, accessing the first data from the storage device;

caching the first data into the cache;

obtaining first index information of the first data; and recording the first index information into the index structure, wherein the index structure is divided into a plurality of index units, one of the plurality of index units comprises respective spaces for storing a set of cache entries, and a cache entry from the set of cache entries is used to record index information of data corresponding to the cache entry, and wherein the recording the first index information into the index structure comprises:

selecting, from the plurality of index units, an index unit for recording the first index information;

determining whether there is an available space in the index unit;

in response to determining that there is an available space in the index unit, generating a first cache entry associated with the first index information; and writing the first cache entry into the available space.

17. The device according to claim 16, wherein the first data is stored in the tree structure in the storage device, the first index information comprises a first identifier, stored in the first identifier data structure, for identifying the tree structure in the storage device and a second identifier, stored in the second identifier data structure, for identifying the first data in the tree structure, and wherein the generating the first cache entry comprises:

generating a first index value for the first identifier;

generating a second index value for the second identifier;

in response to the first data being accessed from the storage device, determining a second time at which the first data is accessed from the storage device; and generating the first cache entry based on the first index value, the second index value and the second time.

18. The device according to claim 16, wherein the index unit comprises a plurality of cache entries, and the acts further comprise:

in response to determining that there is no available space in the index unit, determining, from the plurality of cache entries, a second cache entry to be removed from the index unit, the second cache entry being stored in a space in the index unit;

removing the second cache entry from the index unit, so as to cause second data corresponding to the second cache entry to be removed from the cache;

generating a first cache entry associated with the first index information; and writing the first cache entry into the space, wherein a cache entry from the plurality of cache entries records a last time at which data corresponding to the cache entry was accessed, and wherein determining the second cache entry to be removed from the index unit comprises:

selecting the second cache entry from the plurality of cache entries, such that the last time recorded in the second cache entry is earlier than the last time recorded in a further cache entry from the plurality of cache entries.

19. A computer program product being tangibly stored on a non-transitory computer storage medium and comprising machine-executable instructions which, when executed by a device, cause the device to perform operations, comprising:

receiving a request to access first data in a storage device, at least a part of data in the storage device being cached in a cache, and index information of the at least a part of data being recorded in an index structure that is separate from and references the cache, wherein the index structure comprises:
- a first identifier data structure that is indicative of a key of a key-value pair arrangement, wherein the first identifier data structure identifies a tree structure;
- a second identifier data structure that is indicative of a value of the key-value pair arrangement, wherein the second identifier data structure identifies the first data within the tree structure; and
- a timestamp entry indicative of a time at which associated data in the cache was last accessed;

querying the index structure to determine whether the first data is cached in the cache; and accessing the first data based on a result of the query.

20. The computer program product according to claim 19, wherein the selecting the index unit for recording the first index information comprises:

selecting, from the plurality of index units, the index unit for recording the first index information, such that index information of data is uniformly recorded in the plurality of index units, wherein the determining whether there is an available space in the index unit comprises:

determining whether a first number of cache entries stored in the index structure is below a first threshold;

determining whether a second number of cache entries stored in the index unit is below a second threshold;

in response to the first number being below the first threshold and the second number being below the second threshold, determining that there is an available space in the index unit; and in response to the first number exceeding the first threshold or the second number exceeding the second threshold, determining that there is no available space in the index unit.

* * * * *